(12) United States Patent
Marchesini et al.

(10) Patent No.: US 10,309,548 B2
(45) Date of Patent: Jun. 4, 2019

(54) APPARATUS FOR ACTUATING A VALVE

(71) Applicant: WAMGROUP S.p.A., Modena (IT)

(72) Inventors: Vainer Marchesini, San Prospero (IT); Luca Golinelli, San Possidonio (IT)

(73) Assignee: WAMGROUP S.P.A., Modena (IT)

( * ) Notice: Subject to any disclaimer, the term of this patent is extended or adjusted under 35 U.S.C. 154(b) by 0 days.

(21) Appl. No.: 15/464,171

(22) Filed: Mar. 20, 2017

(65) Prior Publication Data
US 2017/0268692 A1   Sep. 21, 2017

(30) Foreign Application Priority Data

Mar. 21, 2016 (IT) ................. 20201629313

(51) Int. Cl.
  *F16K 31/54* (2006.01)
  *F16K 37/00* (2006.01)
  *F16K 31/122* (2006.01)

(52) U.S. Cl.
  CPC ............ *F16K 31/122* (2013.01); *F16K 31/54* (2013.01); *F16K 37/0008* (2013.01)

(58) Field of Classification Search
  CPC .... F16K 31/122; F16K 31/54; F16K 37/0008; Y10T 137/8359; Y10T 137/8275; Y10T 137/8292
  USPC ................. 251/58, 250; 137/559, 556, 556.3
  See application file for complete search history.

(56) References Cited

U.S. PATENT DOCUMENTS

| | | | | |
|---|---|---|---|---|
| 3,195,418 A | * | 7/1965 | Zukas ................. | F16K 31/1635 251/58 |
| 3,338,140 A | * | 8/1967 | Sheesley ............... | F15B 15/065 251/58 |
| 3,596,679 A | * | 8/1971 | Sugden, Jr. ......... | F15B 13/0402 251/250 |
| 4,494,566 A | * | 1/1985 | Sinclair ............... | F16K 37/0008 137/556 |
| 4,564,169 A | * | 1/1986 | Nordlund .............. | F15B 15/065 251/58 |
| 4,597,556 A | * | 7/1986 | Sandling ................. | F16K 31/54 137/556 |
| 4,629,157 A | * | 12/1986 | Tsuchiya ............... | F16K 31/163 251/58 |
| 5,213,135 A | * | 5/1993 | Moate ................. | F16K 31/1655 251/58 |
| 5,223,822 A | * | 6/1993 | Stommes ............ | F16K 37/0008 137/556 |
| 6,044,791 A | * | 4/2000 | LaMarca ............. | F16K 37/0058 116/277 |
| 6,155,531 A | * | 12/2000 | Holborow ............. | F15B 15/065 251/58 |
| 7,401,759 B2 | * | 7/2008 | Alfieri ...................... | F16K 31/54 251/58 |
| 9,618,136 B2 | * | 4/2017 | Bell .................... | F16K 37/0008 |
| 2015/0075652 A1 | * | 3/2015 | Bell .................... | F16K 37/0008 137/556 |

* cited by examiner

*Primary Examiner* — Eric Keasel
(74) *Attorney, Agent, or Firm* — Leason Ellis LLP

(57) ABSTRACT

An apparatus for actuating a valve. The apparatus comprises:
  an actuator device comprising a piston contained in a cylinder; the actuator device being actuated by a pressurized fluid, in particular compressed air;
  an opening/closing mechanism of a valve actuated by the actuator device; and
  a valve device to control and check the flow of pressurized fluid from and toward the actuator device in order to open/close the valve. The valve device is fixed to a front face of the actuator device on the side of the opening/closing mechanism of the valve.

10 Claims, 3 Drawing Sheets

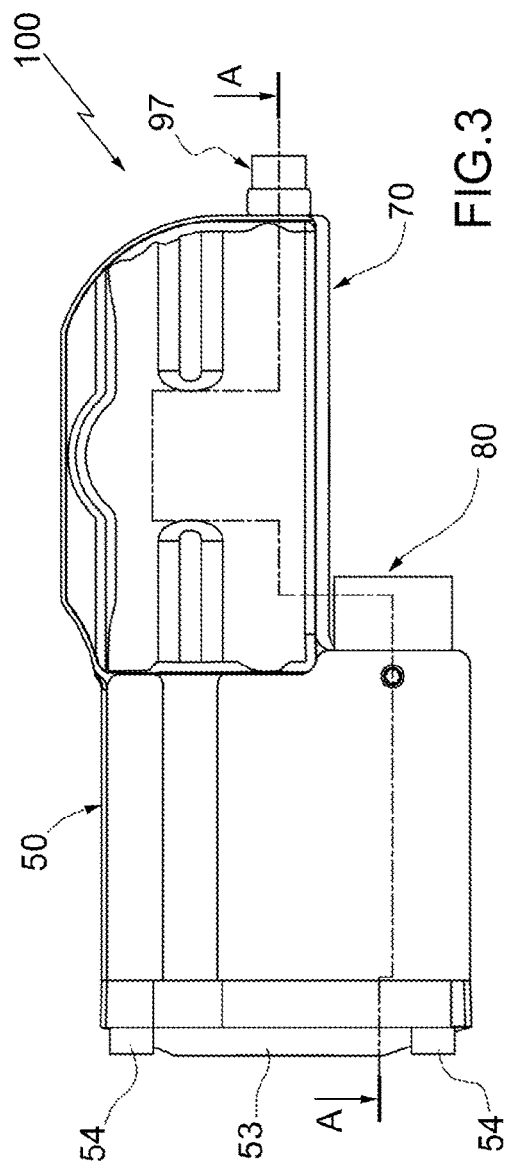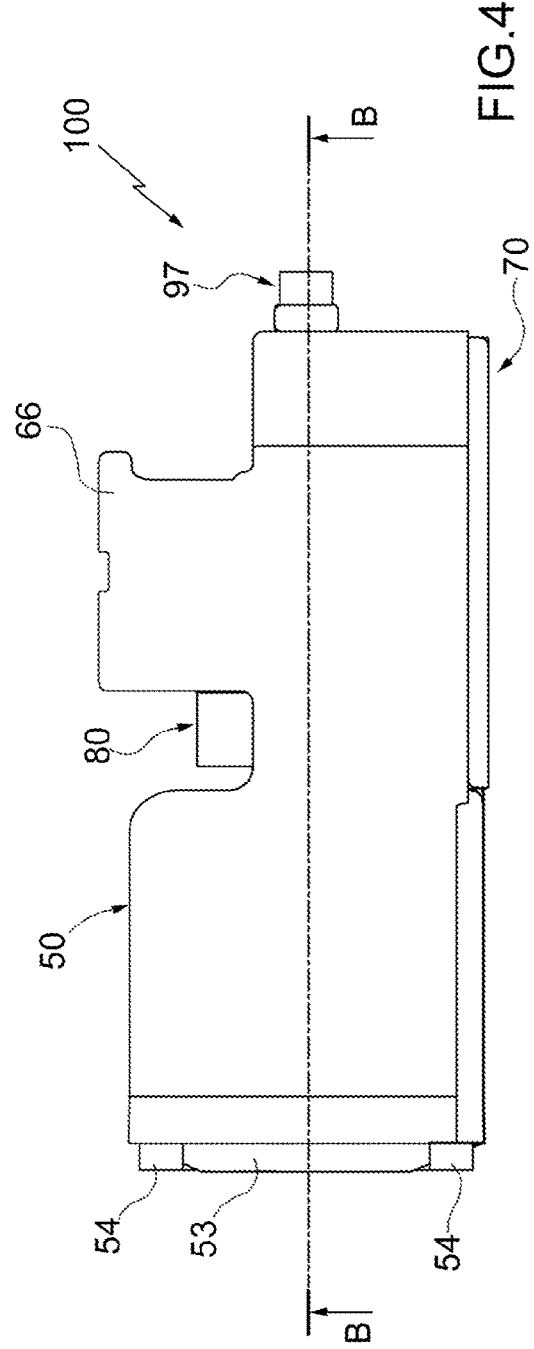

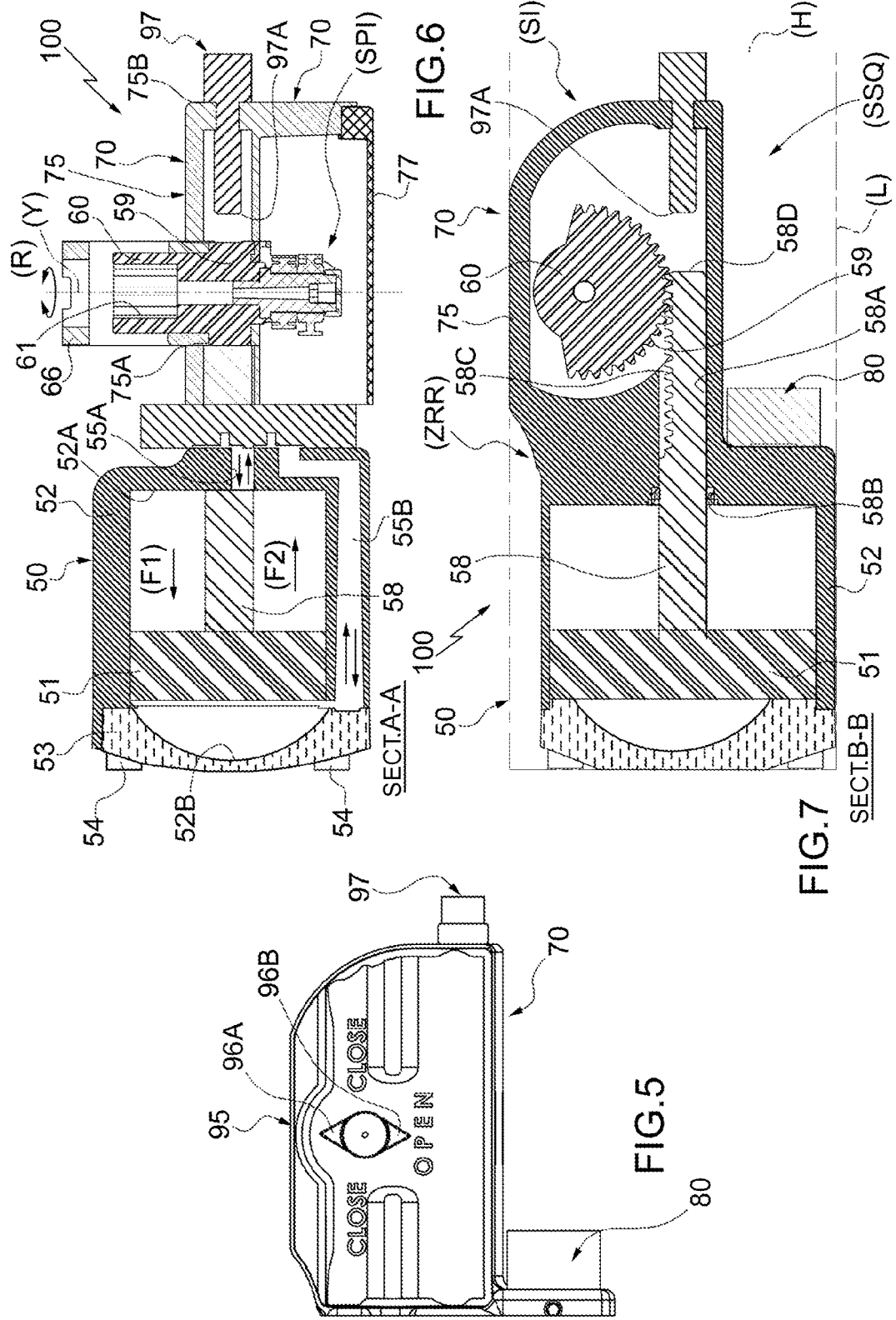

APPARATUS FOR ACTUATING A VALVE

PRIORITY CLAIM

This application claims priority from Italian Utility Model Application No. 202016000029313 filed on Mar. 21, 2016, the disclosure of which is incorporated by reference.

TECHNICAL FIELD

The present invention relates to an apparatus for actuating a valve.

More particularly, the present invention relates to a new, single-piston, compact, pneumatic rotary actuator, incorporating a fixing system and a position detector.

This new actuating apparatus has been designed to obtain a compact shape with profiles that prevent the deposit of dirt particles.

Moreover, the present apparatus provides the use of few simply and inexpensively assembled components.

The present apparatus has an advantageous, but not exclusive, application in the fields requiring a zero or a reduced dirt particles deposit, such as e.g. the food industry. The particular shape of the apparatus allows the installation of the control electric valve in the actuator. The air ducts are arranged in the actuator casing, and are obtained directly during the die-casting of the casing (i.e. without subsequent machining operations). Always thanks to this complex shape, the space housing the position detectors of the rotating shaft could be integrated in the overall shape (without any risk of breakage).

BACKGROUND OF THE INVENTION

In the field of valve actuators, single-piston actuating apparatuses are well known. Usually, single-piston apparatuses do not have continuous profiles because the fixing of the various components does not allow it. In these cases, the control electric valve of the actuator is only close to the actuator and some pneumatic connections are required to drive the actuator.

It is also well known that the most sophisticated versions of single-piston actuators use an electric valve of the "namur" type (with no pneumatic fittings), normally fixed to the rear head of the actuator or on the bottom of the actuator.

However, also in such a case, an outer pneumatic connection is required to send compressed air to the front head of the actuator.

Moreover, the device for detecting the position of the shaft for opening/closing the valve is usually inserted in a plastic box added to the actuator.

Moreover, known solutions integrate in the actuator a niche for the position control or an actuator coupling system, but both of them are never present in a single-piston monoblock system.

Moreover, even more advanced solutions available on the market, in which the compressed air ducts are integrated in the cylinder casing, have the drawback that the control electric valve protrudes with respect to the overall shape of the apparatus, and is therefore subject to possible breakage and to the hazardous entrance of dust, which can even seriously damage the electric valve and the actuator operation.

Furthermore, well-known problems in the apparatuses currently available on the market are:
 stagnation of dust on the pneumatic actuators;
 incorrect use due to the appearance of connection errors;
 breakage of the boxes containing the position detectors.

SUMMARY OF THE INVENTION

Therefore, the object of the present invention is to provide an apparatus for actuating a valve that is free from the aforesaid drawbacks and, at the same time, is easy and inexpensive to manufacture.

In other words, the present invention provides a compact, single-piston, monoblock actuator with a complex shape integrating the actuator fixing system and hiding in its overall shape the control electric valve with the air ducts integrated in the actuator casing.

Moreover, it provides a space inside the overall space (outline) to insert the shaft position detectors.

Due to the low number of components, a possible air loss is considerably reduced, as well as any possible clearance between the actuator and the outlet shaft.

The ducts integrated in the actuator casing shorten the compressed air path and therefore the consumption of compressed air required for the actuation, thus speeding up the actuator response times.

The integration of the position control system, of the actuator coupling bracket and of the electric valve help to reduce the number of dust stagnation areas and therefore the potential moulds or bacteria sources.

The present invention refers to an apparatus for actuating a valve; the apparatus comprising:
 an actuator device comprising a piston contained in a cylinder; the actuator device being actuated by a pressurised fluid, in particular compressed air;
 an opening/closing mechanism of a valve actuated by the actuator device; and
 a valve device to control and check the flow of the pressurised fluid from and toward the actuator device for opening/closing the valve;
 actuating apparatus wherein the valve device is fixed to a front face of the actuator device on the side of the valve opening/closing mechanism.

BRIEF DESCRIPTION OF THE DRAWINGS

For a better understanding of the present invention, it is now described a preferred embodiment, purely as a non-limiting example and with reference to the accompanying drawings, in which:

FIG. 3 shows a first front two-dimensional view of the actuating apparatus of FIG. 1;

FIG. 4 shows a second front two-dimensional view of the actuating apparatus of FIG. 1;

FIG. 5 shows a portion of the first two-dimensional view of FIG. 3;

FIG. 6 shows a section A-A of the apparatus shown in FIG. 3; and

FIG. 7 shows a section B-B of the apparatus shown in FIG. 4.

DETAILED DESCRIPTION OF THE INVENTION

Figure 1:
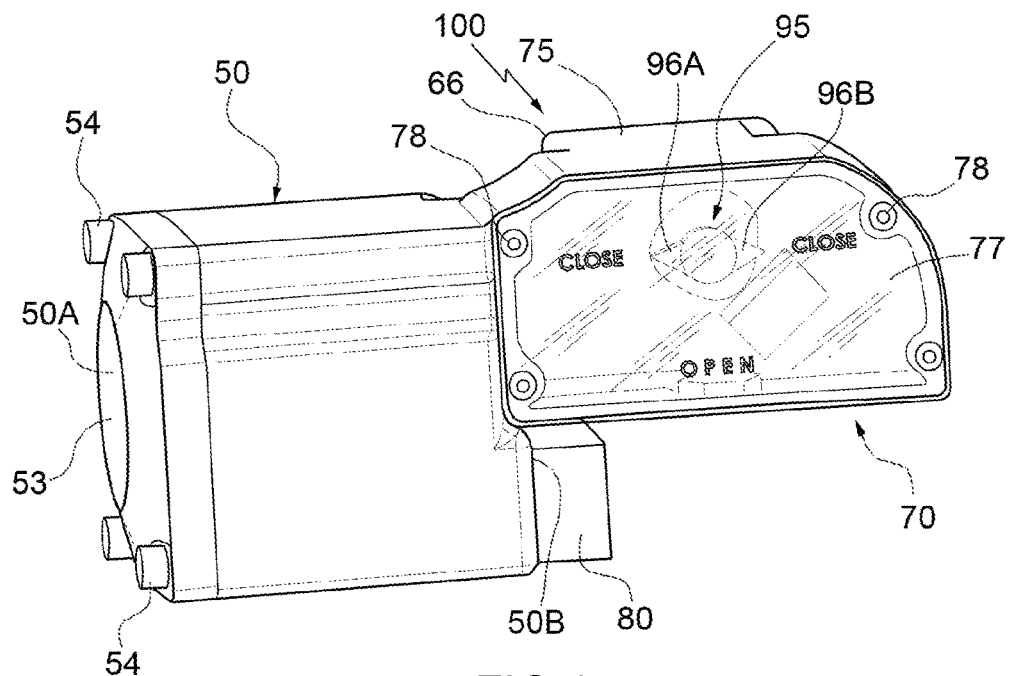
FIG. 1 shows a first three-dimensional view of the apparatus for actuating a valve according to the teaching of the present invention.

In the attached figures, number 100 indicates as a whole an apparatus for actuating a valve according to the teaching of the present invention.

The apparatus for actuating a valve 100 (not shown) includes:
- an actuator device 50 comprising, in turn (FIG. 6), a piston 51 contained in a cylinder 52; said actuator device 50 being actuated by a pressurised fluid, in particular compressed air; moreover, in use, the cylinder 52 is closed by a cover 53 by means of a fixing system 54 (represented by four screws 54 in FIG. 1); furthermore, the actuator device 50 comprises a first front face 50A (coinciding with the outer face of said cover 53), and a second front face 50b, opposite to said first front face 50A.
- an opening/closing mechanism 70 of a valve actuated by the actuator device 50; and
- a valve device 80 to control and check the flow of pressurised fluid from and toward the actuator device 50 to open/close the valve (not shown).

The valve device 80 is supplied with compressed air in a known manner.

In the present context, it is assumed that the valve device 80 takes the form of a box-like body lacking any fitting element.

The valve device 80 is fixed (by known and not shown means) to the front face 50b of the actuator device 50 on the side of the opening/closing mechanism 70.

As shown in FIGS. 1, 5, 7, the valve device 80 is contained in an overall space (SI) of the apparatus, said space being defined in projection by a maximum height (H) and by a maximum length (L) (FIG. 7).

The valve device 80 (FIG. 7) is contained in an undercut space (SSQ) and close to a connection area (ZRR) between the actuator device 50 and the opening/closing mechanism 70.

Figure 2:
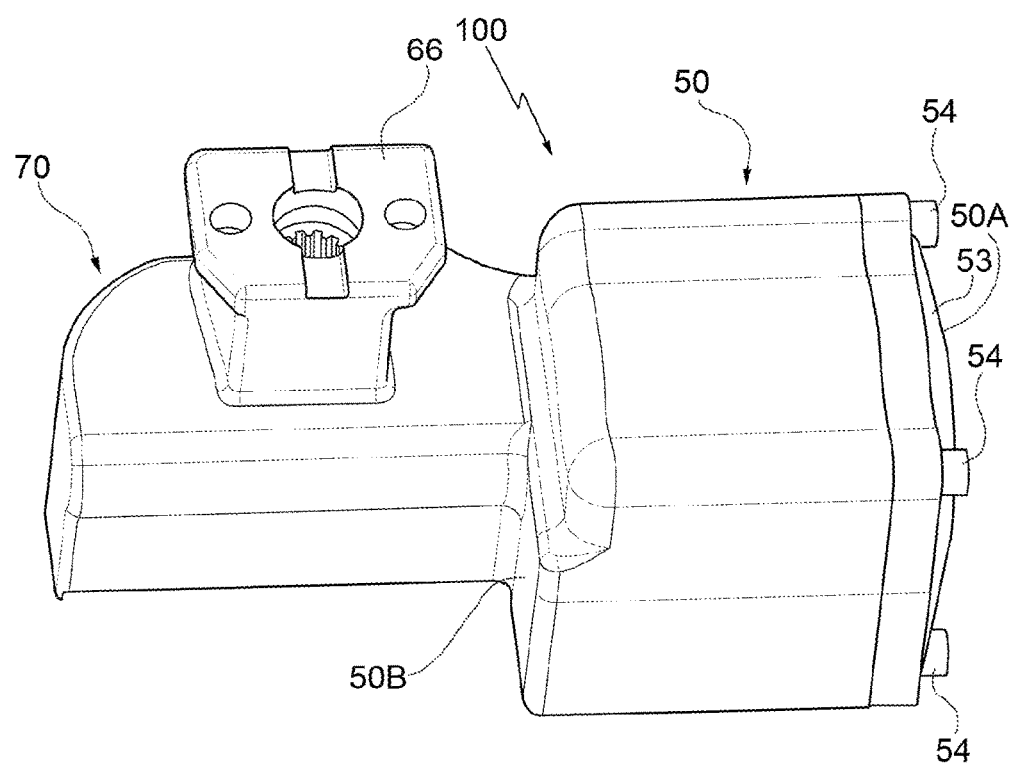
FIG. 2 shows a second three-dimensional view of the actuating apparatus of FIG. 1.

Advantageously, but not necessarily, as shown in FIGS. 1 and 2, the actuator device 50 and the opening/closing mechanism 70 may have a single monoblock casing 75 (see e.g. FIGS. 1, 7) made of a single piece, for example made of metal or plastic material.

The casing 75, besides being laterally closed by said cover 53, is frontally closed by an at least partially transparent cover 77 (fixed to the casing 75 through a removable attachment system, such as, e.g. a coupling system, a snap-on system, or more simply by means of screws 78). The operation of this at least partially transparent cover 77 will be explained below.

FIG. 6 shows in detail how the piston 51 divides the cylinder 52 into a first chamber 52A and into a second chamber 52B.

The valve device 80 is in fluid communication with the first chamber 52A by means of a first duct 55A, and, alternatively, with the second chamber 52B through a second duct 55B (FIG. 6).

At least one of the two ducts 55a, 55B has a variable section along its path.

As shown in FIG. 6, the second duct 55b is longer than the first duct 55A.

Moreover, the second chamber 52B is delimited on the one side by the inner surface of the cover 53, and on the other side by one of the two faces of the piston 51.

Both ducts 55a and 55B are formed in the cylinder 52.

Each duct 55A, 55B can become, from time to time, the compressed air supply duct or the compressed air exhaust duct.

More specifically, if the compressed air, controlled by the valve device 80, enters the first chamber 52A flowing into the first duct 55A, the air contained in the second chamber 52B will leave through the second duct 55B and the piston 51 will move according to an arrow (F1); vice versa, if the compressed air, always controlled by the valve device 80, enters the second chamber 52B flowing into the second duct 55B, the air contained in the first chamber 52A will leave through the first duct 55a and the piston 51 will move according to an arrow (F2) (whose direction is opposite to the one of (F1)).

All the compressed air loading/unloading operations in the two chambers 52A, 52B are controlled by the valve device 80, which in turn is controlled by an electronic control unit (not shown).

As shown in FIGS. 6, 7, the piston 51 is coupled to a rod 58 that extends for the entire length of the actuator device 50 and for at least a portion of the length of the opening/closing mechanism 70.

The rod 58 (FIG. 7) is guided by a guide 58a in between the actuator device 50 and the opening/closing mechanism 70.

To prevent any leakage of compressed air, the area of the guide 58a facing the first chamber 52A is equipped with a seal 58B (FIG. 7).

At least a portion of the rod 58 is provided with a rack 58C, which, in use, meshes with a toothed sector 59, which is part of a bushing 60 provided with a coupling toothing 61 with a valve (not shown).

The bushing 60 at least partially protrudes from the portion of the casing 75 belonging to the opening/closing mechanism 70, and said bushing 60 is further contained in a flanged sleeve 66, also protruding from an opening 75a formed in the casing 75 (FIG. 6). While the flanged sleeve 66 is fixed with respect to the casing 75, the bushing 60 can rotate around a shaft (Y) (FIG. 6) according to two opposite directions indicated in the figure. by an arrow (R).

The rack 58C, the toothed sector 59 and the bushing 60 for actuating the valve belong, to all the effects, to the opening/closing mechanism 70.

Obviously, the direction of instantaneous rotation of the bushing 60 is given by the direction of movement of the rod 50 and in particular of its rack 58c (FIGS. 6, 7).

Moreover, the bushing 60 is coupled to a shaft 90 that extends on the opposite side with respect to the flanged sleeve 66.

The free end of the shaft 90 is provided with a device 95 (FIG. 1) indicating the angular position of the bushing 60.

The indicator device 95 is provided with at least one needle 96A, 96B that, after the rotation, stops on a writing (CLOSE or OPEN) indicating the state of the valve (not shown), i.e. if the valve is "open" or "closed".

Thanks to the fact that the cover 77 is at least partially transparent, a user can easily check from the outside, at any time, the opening/closing of the valve.

The whole indicator device 95 is contained in a space (SPI) which is completely integrated in the casing 75 (FIG. 6). This ensures that the indicator device 95 is properly protected from dust (and from any other undesired substance) always present in the environments where the apparatus 100 operates.

As shown in greater detail in FIGS. 6, 7, the opening/closing mechanism 70 is also provided with a substantially screw-shaped limit element 97 of the rod 58; such limit element 97 being screwed in a threaded hole 75b formed on the casing 75, and being arranged opposite the free end 58d of the rod 58.

In fact, by screwing, more or less, the limit element 97 in the threaded hole 75b, an operator can establish how much the free end 58d of the rod 58 can be moved before it abuts on the free end 97a of the limit element 97.

This obviously allows a consequent adjustment of the angle of rotation of the toothed sector 59, and then of the valve opening/closing.

The main advantages of the apparatus for actuating a valve according to the present invention are the following:
- a continuous profile, essentially free of dust stagnation areas, to be used in the food industry;
- a drastic reduction in the consumption of compressed air necessary for its actuation;
- a reduction of the possibility of error in the connections among the different components; and
- a greater reactivity of the actuator.

The invention claimed is:

1. An apparatus (100) for actuating a valve; the apparatus (100) comprising:
    an actuator device (50) comprising a piston (51) contained in a cylinder (52); said actuator device (50) being actuated by a pressurised fluid;
    an opening/closing mechanism (70) of the valve actuated by said actuator device (50); and
    a valve device (80) to control and check the flow of said pressurised fluid from and toward said actuator device (50) for opening/closing the valve;
    wherein said valve device (80) is fixed to a front face (50B) of said actuator device (50) and is located along one side of said valve opening/closing mechanism (70);
    wherein said valve device (80) is contained in an overall space (SI) of the apparatus (100), said overall space (SI) being defined in projection by a maximum height (H) and by a maximum length (L);
    wherein said valve device (80) is contained in an undercut space (SSQ) and close to a connection area (ZRR) between said actuator device (50) and said opening/closing mechanism (70);
    wherein the cylinder (52) includes ducts (55A, 55B) that are directly formed in said cylinder (52) and through which the pressurised fluid flows;
    wherein the valve device is fixed to an externally exposed planar end surface of the actuator device and similarly is located along one externally exposed side of the opening and closing mechanism.

2. An actuating apparatus (100) according to claim 1, wherein at least one of the two ducts (55A, 55B) has a variable section along its path.

3. An actuating apparatus (100) according to claim 1, wherein said actuating device (50) and said opening/closing mechanism (70) have a single monoblock casing (75).

4. An actuating apparatus (100) according to claim 3, wherein said single monoblock casing (75) comprises an at least partially transparent cover (77).

5. An actuating apparatus (100) according to claim 1, wherein said opening/closing mechanism (70) comprises a rack (58C) formed on at least a portion of a rod (58) fixed to said piston (51); said rack (58C) being coupled to a toothed sector (59).

6. An actuating apparatus (100) according to claim 5, further comprising a device (95) indicating the valve opening/closing; said indicator device (95) being contained in a space (SPI) in a housing (75), and said indicator device (95) being further coupled to said toothed sector (59).

7. An actuating apparatus (100) according to claim 5, wherein said opening/closing mechanism (70) is further provided with a limit element (97) arranged opposite a free end (58D) of said rod (58).

8. An actuating apparatus (100) according to claim 1, wherein the pressurised fluid comprises compressed air.

9. An apparatus (100) for actuating a valve; the apparatus (100) comprising:
    an actuator device (50) comprising a piston (51) contained in a cylinder (52); said actuator device (50) being actuated by a pressurised fluid;
    an opening/closing mechanism (70) of the valve actuated by said actuator device (50); and
    a valve device (80) to control and check the flow of said pressurised fluid from and toward said actuator device (50) for opening/closing the valve;
    wherein said valve device (80) is fixed to a front face (50B) of said actuator device (50) and is located along one side of said valve opening/closing mechanism (70);
    wherein said valve device (80) is contained in an overall space (SI) of the apparatus (100), said overall space (SI) being defined in projection by a maximum height (H) and by a maximum length (L);
    wherein said valve device (80) is contained in an undercut space (SSQ) and close to a connection area (ZRR) between said actuator device (50) and said opening/closing mechanism (70);
    wherein the cylinder (52) includes ducts (55A, 55B) that are directly formed in said cylinder (52) and through which the pressurised fluid flows, wherein each of the ducts (55A, 55B) has a first end that is open along the exposed front face (50B) and an opposite second end is in communication with a hollow interior space of the cylinder (52) in which the piston (51) is contained.

10. An apparatus (100) for actuating a valve; the apparatus (100) comprising:
    an actuator device (50) comprising a piston (51) contained in a cylinder (52); said actuator device (50) being actuated by a pressurised fluid;
    an opening/closing mechanism (70) of the valve actuated by said actuator device (50);
    a valve device (80) to control and check the flow of said pressurised fluid from and toward said actuator device (50) for opening/closing the valve;
    wherein said valve device (80) is fixed to a front face (50B) of said actuator device (50) and is located along one side of said valve opening/closing mechanism (70);
    wherein said valve device (80) is contained in an overall space (SI) of the apparatus (100), said overall space (SI) being defined in projection by a maximum height (H) and by a maximum length (L);
    wherein said valve device (80) is contained in an undercut space (SSQ) and close to a connection area (ZRR) between said actuator device (50) and said opening/closing mechanism (70);
    wherein the cylinder (52) includes ducts (55A, 55B) that are directly formed in said cylinder (52) and through which the pressurised fluid flows;
    wherein the valve device is entirely disposed below an overhang defined by an externally exposed surface of the opening/closing mechanism that protrudes outwardly from the externally exposed front face (50B).

* * * * *